United States Patent
Ikegame et al.

(10) Patent No.: US 12,214,854 B2
(45) Date of Patent: Feb. 4, 2025

(54) VESSEL AZIMUTH CONTROL APPARATUS AND AZIMUTH CONTROL METHOD

(71) Applicant: Mitsubishi Electric Corporation, Tokyo (JP)

(72) Inventors: Toru Ikegame, Tokyo (JP); Naoki Imamura, Tokyo (JP); Takuya Ishioka, Tokyo (JP); Ryo Sakaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 290 days.

(21) Appl. No.: 17/674,474

(22) Filed: Feb. 17, 2022

(65) Prior Publication Data

US 2022/0315193 A1 Oct. 6, 2022

(30) Foreign Application Priority Data

Mar. 31, 2021 (JP) ................................ 2021-059533

(51) Int. Cl.
  *B63H 25/04* (2006.01)
  *B63H 25/36* (2006.01)
  *G05D 1/00* (2024.01)

(52) U.S. Cl.
  CPC ............ *B63H 25/04* (2013.01); *B63H 25/36* (2013.01); *G05D 1/0206* (2013.01); *B63H 2025/045* (2013.01)

(58) Field of Classification Search
  None
  See application file for complete search history.

(56) References Cited

U.S. PATENT DOCUMENTS

| | | | |
|---|---|---|---|
| 11,378,984 B2 * | 7/2022 | Imamura | G01C 21/203 |
| 2019/0324462 A1 | 10/2019 | Imamura et al. | |

(Continued)

FOREIGN PATENT DOCUMENTS

| | | | | |
|---|---|---|---|---|
| CN | 109669469 | * | 12/2018 | |
| CN | 109669469 A | * | 4/2019 | ........... G05D 1/0875 |

(Continued)

OTHER PUBLICATIONS

Notice of Reasons for Refusal dated May 10, 2022 from the Japanese Patent Office in Japanese Application No. 2021-059533.

*Primary Examiner* — Jean Paul Cass
(74) *Attorney, Agent, or Firm* — Sughrue Mion, PLLC

(57) ABSTRACT

The objective is to obtain an azimuth control apparatus and an azimuth control method that require no excessive memory capacity and calculation time for information processing and can cope with a disturbance by adaptively adjusting a control gain while calculating changing vessel parameters online. The vessel azimuth control apparatus has an azimuth control unit that outputs a steering-angle command signal for making a vessel turn to an azimuth to which the vessel should travel, based on an azimuth command signal generated by an azimuth command generation unit, a yaw-angle signal, and a yaw-angular-velocity signal,
a steering-angle control unit that controls a rudder based on the steering-angle command signal, and
a control gain adjustment unit that calculates respective frequency responses of the yaw-angle signal and the yaw-angular-velocity signal to a steering-angle signal outputted by a steering-angle detection unit and then adjusts a control gain of the azimuth control unit.

10 Claims, 10 Drawing Sheets

(56) References Cited

U.S. PATENT DOCUMENTS

| | | | | |
|---|---|---|---|---|
| 2021/0255640 A1* | 8/2021 | Imamura | ............... | G01C 21/203 |
| 2022/0269289 A1* | 8/2022 | Imamura | ................ | B63H 25/04 |
| 2022/0315193 A1* | 10/2022 | Ikegame | .............. | G05D 1/0206 |
| 2023/0406473 A1* | 12/2023 | Ikegame | ................ | B63H 25/04 |

FOREIGN PATENT DOCUMENTS

| | | | | |
|---|---|---|---|---|
| EP | 2071714 A1 * | 6/2009 | .............. | H02M 1/36 |
| JP | 2006-321455 A | 11/2006 | | |
| JP | 6563067 B1 | 8/2019 | | |

* cited by examiner

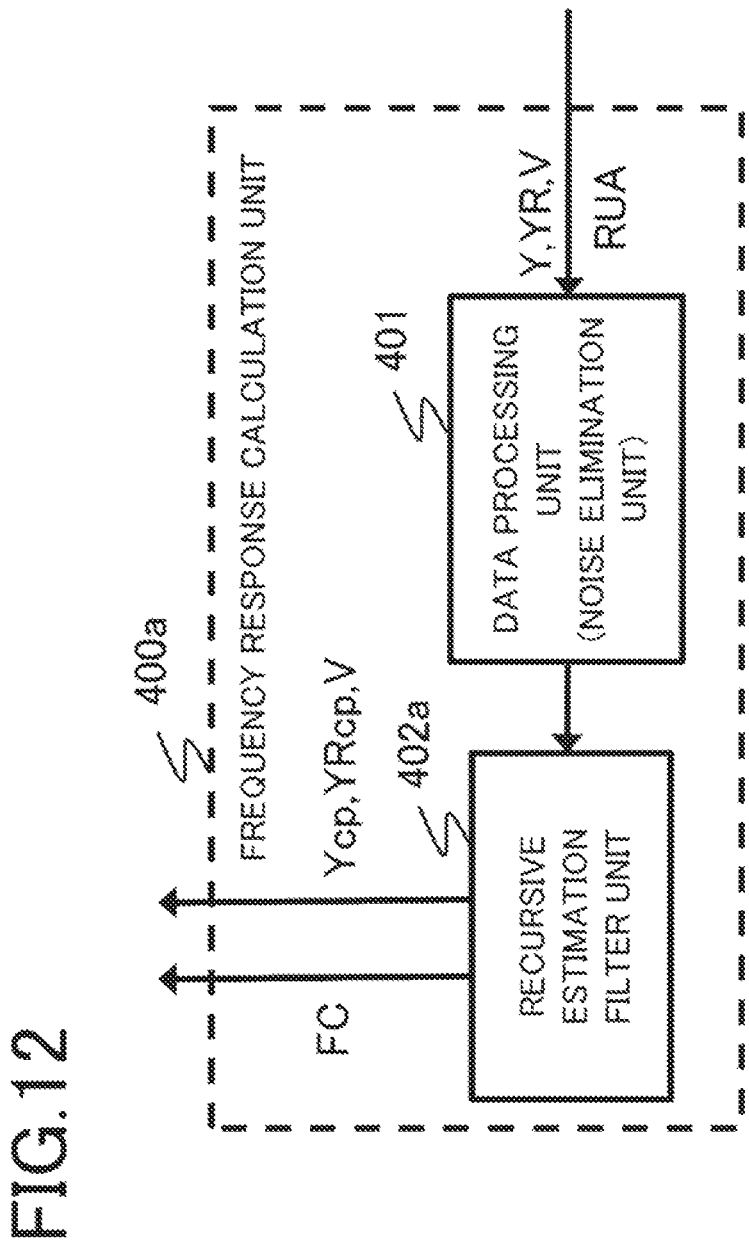

VESSEL AZIMUTH CONTROL APPARATUS AND AZIMUTH CONTROL METHOD

BACKGROUND OF THE INVENTION

Field of the Invention

The present disclosure relates to a vessel azimuth control apparatus and an azimuth control method.

Description of the Related Art

There exists an azimuth control apparatus that performs steering in such a way as to orient the traveling direction of a vessel to a designated course and to maintain the traveling direction. A vessel azimuth control apparatus is referred to also as a vessel automatic steering apparatus or a vessel autopilot. A vessel azimuth control apparatus controls a rudder in such a way as to make a yaw angle, which is a rotation angle around the vertical-direction axis that passes through the gravity center of a vessel, coincide with a designated azimuth.

A vessel azimuth control apparatus is an apparatus that controls a rudder in order to make a bow azimuth (yaw angle) follow a designated azimuth. A vessel azimuth control apparatus multiplies the error between a designated azimuth and a bow azimuth by a predetermined control gain so as to generate a steering-angle command and controls a rudder in accordance with the steering-angle command. A vessel azimuth control apparatus drives a rudder through a rudder driving unit. The rudder driving unit drives the rudder and makes the vessel induce a yaw rate so as to change the bow azimuth.

In a vessel azimuth control apparatus, it is required to optimize the control gain in order to prevent disturbance factors, such as a tidal current, an ocean wave, and a storm, from promoting vibration of the vessel. The control gain can be determined based on vessel parameters. However, vessel parameters change in accordance with a change in a vessel speed, a draft, or the like.

Accordingly, it is required to cope with a change in the vessel parameters. An actual vessel is made to sail, and then input data pieces (steering angles) and output data pieces (bow azimuths) are accumulated. In contrast to the accumulated data pieces, input data pieces (steering angles) are provided to a vessel model formed by preliminarily and tentatively determining the vessel parameters, so that output data pieces (bow azimuths) are calculated. There has been disclosed a technology (e.g., Patent Document 1) in which based on the result of comparison between the calculated bow azimuth and an actually measured bow azimuth, the vessel parameters are adjusted (modified).

Prior Art Reference

Patent Document

[Patent Document 1] Japanese Patent Application Laid-Open No. 2006-321455

SUMMARY OF THE INVENTION

However, in the vessel azimuth control apparatus according to Patent Document 1, steering-angle commands and bow-azimuth data pieces are accumulated and vessel parameters are identified by use of SQP (Sequential Quadratic Programming) algorithm; thus, information processing in the vessel azimuth control apparatus requires much memory capacity and calculation time. As a result, because a large memory capacity and a high-speed high-function computing processing unit are required, the cost of the vessel azimuth control apparatus is caused to rise. When a simple first-order model is utilized for a vessel model as an identification subject, no overshooting occurs at a time of veering. Accordingly, there has been a problem that the vessel azimuth control apparatus according to Patent Document 1 cannot be applied to a vessel in which yawing vibration occurs depending on a vessel speed.

Moreover, in order to optimize the control gain, it is required that when the vessel speed changes, the vessel parameters are calculated again. However, there has been a problem that because the method in the prior art requires much memory capacity and calculation time, the vessel parameters cannot instantaneously be modified.

The present disclosure has been implemented in order to solve the foregoing problems; the objective thereof is to obtain an azimuth control apparatus and an azimuth control method that require no excessive memory capacity and calculation time for information processing and can cope with a disturbance by appropriately adjusting the control gain while calculating changing vessel parameters online.

A vessel azimuth control apparatus according to the present disclosure includes an azimuth command generation unit that generates an azimuth command signal indicating an azimuth to which a vessel should travel, a yaw-angle detection unit that outputs a yaw-angle signal indicating a rotation angle around a vertical axis passing through the gravity center of the vessel, a yaw-angular-velocity detection unit that outputs a yaw-angular-velocity signal indicating a rotation angular velocity around the vertical axis passing through the gravity center of the vessel, a steering-angle detection unit that outputs a steering-angle signal indicating an angle of a rudder of the vessel, an azimuth control unit that outputs a steering-angle command signal for making the vessel turn to the azimuth to which the vessel should travel, based on the azimuth command signal generated by the azimuth command generation unit, the yaw-angle signal outputted by the yaw-angle detection unit, and the yaw-angular-velocity signal outputted by the yaw-angular-velocity detection unit, a steering-angle control unit that control a rudder, based on the steering-angle command signal outputted by the azimuth control unit, and a control gain adjustment unit that calculates respective frequency responses of the yaw-angle signal and the yaw-angular-velocity signal to a steering-angle signal outputted by a steering-angle detection unit and then adjusts a control gain of the azimuth control unit.

A vessel azimuth control method according to the present disclosure includes a step in which an azimuth command generation unit generates an azimuth command signal indicating an azimuth to which a vessel should travel, a step in which a yaw-angle detection unit outputs a yaw-angle signal indicating a rotation angle around a vertical axis passing through the gravity center of the vessel, a step in which a yaw-angular-velocity detection unit outputs a yaw-angular-velocity signal indicating a rotation angular velocity around the vertical axis passing through the gravity center of the vessel, a step in which a steering-angle detection unit outputs a steering-angle signal indicating an angle of a rudder of the vessel, a step in which an azimuth control unit outputs a steering-angle command signal for making the vessel turn to the azimuth to which the vessel should travel, based on the azimuth command signal generated by the azimuth command generation unit, the yaw-angle signal outputted by the yaw-angle detection unit, and the yaw-angular-velocity signal outputted by the yaw-angular-velocity detection unit, a step in which a steering-angle control unit controls a rudder, based on the steering-angle command signal, and a step in which a control gain adjustment unit calculates respective frequency responses of the yaw-angle signal and the yaw-angular-velocity signal to the steering-angle signal outputted by the steering-angle detection unit and then adjusts a control gain of the azimuth control unit.

The present disclosure makes it possible to obtain an azimuth control apparatus and an azimuth control method that require no excessive memory capacity and calculation time for information processing and can cope with a disturbance by appropriately adjusting the control gain while calculating changing vessel parameters online.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 12 is a block diagram representing a configuration of a frequency response calculation unit of the azimuth control apparatus according to Embodiment 2.

DETAILED DESCRIPTION OF THE PREFERRED EMBODIMENTS

Figure 1:
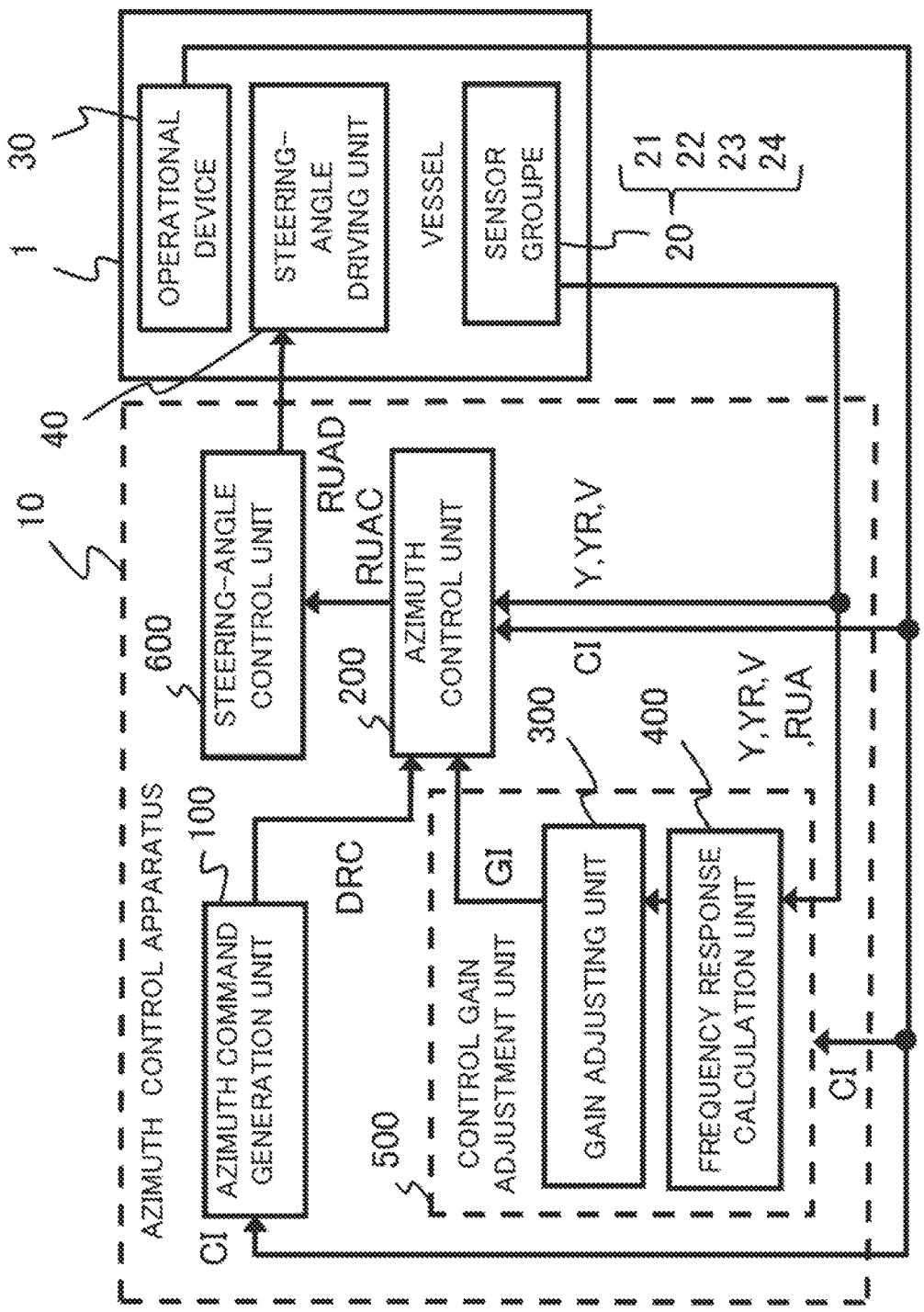
FIG. 1 is a configuration diagram of an azimuth control apparatus according to Embodiment 1.

Hereinafter, preferred embodiments of a vessel azimuth control apparatus and an azimuth control method will be explained with reference to the drawings. In each of the embodiments, the same or equivalent constituent elements are designated by the same reference characters, and the explanation therefor will be omitted.

1. Embodiment 1

Configuration of Azimuth Control Apparatus

FIG. 1 represents a configuration example of a vessel 1 equipped with a vessel azimuth control apparatus 10 according to Embodiment 1. The azimuth control apparatus 10 provided in the vessel 1 receives operation information CI and various kinds of sensor information items from an operational device 30 and a sensor group 20, respectively, and then outputs a steering-angle driving command signal RUAD. The azimuth control apparatus 10 includes an azimuth command generation unit 100, an azimuth control unit 200, a control gain adjustment unit 500 having a gain adjusting unit 300 and a frequency response calculation unit 400, and a steering-angle control unit 600. The azimuth control apparatus 10 inputs respective signals of detection units from the sensor group 20 and receives an azimuth command signal DRC, which indicates an azimuth to which the vessel 1 should travel, from the azimuth command generation unit 100. Then, the azimuth control apparatus 10 outputs a steering-angle driving command signal RUAD to a steering-angle driving unit 40 so as to control the steering angle. The steering-angle driving unit 40 operates the vessel rudder in accordance with the steering-angle driving command signal RUAD. As a result, the azimuth control apparatus 10 makes the azimuth of the vessel 1 change or held by outputting the azimuth command signal DRC, which indicates an azimuth to which the vessel 1 should travel.

The vessel 1 is provided with an unrepresented propulsion unit for propelling a vessel. The output of the propulsion unit is operated through the operational device 30. As the propulsion unit of the vessel 1, an outboard engine can be utilized. In an outboard engine, a screw, as a propelling and steering mechanism, is integrally provided under the engine. An outboard engine is a propulsion system in which the main body is mounted on the outside of the vessel. Control of a traveling azimuth by an outboard engine is performed by changing the mounting angle of the outboard-engine main body in the vessel. An outboard engine is often adopted in a small boat. It may be allowed that two or more outboard engines are provided.

Application of the azimuth control apparatus 10 according to Embodiment 1 is not limited to the application to a vessel provided with an outboard engine. In many cases, a large ship is provided with an inboard engine. An inboard engine is a propelling and steering mechanism having a form in which a driving unit such as an engine is disposed inside a vessel, in which a screw that is coupled with the driving unit and whose rotation direction is changeable is exposed outside the vessel, and in which the rudder is separated from the screw. The azimuth control apparatus 10 according to Embodiment 1 can be applied also to a vessel provided with a propulsion system based on an inboard engine.

In addition, there exists a vessel provided with an inboard-outdrive engine. An inboard-outdrive engine is a propelling and steering mechanism having a form in which a driving unit such as an engine is disposed inside a vessel and in which a screw that is coupled with the driving unit outside the vessel and whose rotation direction is changeable is integrated with the rudder. The azimuth control apparatus 10 according to Embodiment 1 can be applied also to a vessel provided with an inboard-outdrive engine.

The operational device 30 is utilized also when a vessel operator inputs an initial condition and a terminal condition for sailing of a vessel. The sensor group 20 includes, for example, a Global Navigation Satellite System (hereinafter, referred to as a GNSS) for measuring the latitude and the longitude of the vessel 1 and a magnetic azimuth sensor for measuring the azimuth angle of the vessel 1. It may be allowed that the sensor group 20 is provided with an inertial navigation system connected with a gyroscope for measuring the angular velocity of the vessel 1, an acceleration sensor for measuring the translational acceleration of the vessel 1, and the like.

Specifically, as the sensor group 20, there is provided a yaw-angle detection unit 21 that outputs a yaw-angle signal Y indicating a rotation angle around the vertical axis passing through the gravity center of the vessel 1. There is provided a yaw-angular-velocity detection unit 22 that outputs a yaw-angular-velocity signal YR indicating a rotation angular velocity around the vertical axis passing through the gravity center of the vessel 1. There is provided a vessel-speed detection unit 23 that outputs a vessel-speed signal V indicating a vessel speed of the vessel 1. Moreover, there may be provided a steering-angle detection unit 24 that outputs a steering-angle signal RUA indicating a steering angle of the vessel 1. In this situation, although as the yaw-angular-velocity detection unit 22, a sensor for detecting the angular velocity may independently be provided, the angular velocity may be calculated from a value obtained by applying a time differential to the yaw-angle signal Y, which is the output of the yaw-angle detection unit 21. The vessel-speed detection unit 23 can obtain the vessel speed by means of a screw tachometer, a water-surface speed meter, an airspeed meter, an acceleration sensor, a GNSS, a Doppler measurement device based on an electric wave or a laser beam, or the like.

Functions of Azimuth Control Apparatus

The azimuth control apparatus 10 has the azimuth command generation unit 100 that generates the azimuth command signal DRC indicating the azimuth to which the vessel should travel. The azimuth control apparatus 10 receives the yaw-angle signal Y, the yaw-angular-velocity signal YR, the steering-angle signal RUA, and the vessel-speed signal V from the sensor group 20. The azimuth control apparatus 10 receives the operation information CI from the operational device 30.

In response to the azimuth command signal DRC generated by the azimuth command generation unit 100, the azimuth control unit 200 receives the yaw-angle signal Y, the yaw-angular-velocity signal YR, and the vessel-speed signal V and then outputs a steering-angle command signal RUAC based on a control gain in which the stability and the responsiveness coexist with each other. The steering-angle control unit 600 receives the steering-angle command signal RUAC, generates the steering-angle driving command signal RUAD, and then outputs the steering-angle driving command signal RUAD to the steering-angle driving unit 40 so as to control the rudder of the vessel 1.

In response to the operation information CI from the operational device 30, the azimuth control unit 200 outputs an instruction for obtaining the respective frequency responses of the yaw-angle signal Y and the yaw-angular-velocity signal YR to the steering-angle signal RUA for the vessel 1. Specifically, the azimuth control unit 200 outputs the steering-angle command signal RUAC in the shape of a rectangular wave or a saw-tooth wave, and then the control gain adjustment unit 500 obtains output data of each of the yaw-angle signal Y and the yaw-angular-velocity signal YR to the steering-angle command signal RUAC.

The control gain adjustment unit 500 calculates the frequency response based on the obtained output data, and then adjusts the control gain of the azimuth control unit 200 in accordance with the frequency response. This adjustment makes it possible that even when the vessel parameters of the vessel 1 change, for example, due to a change in the vessel speed or the draft, the control gain corresponding to this change is acquired. As a result, it is made possible to obtain an azimuth control apparatus and an azimuth control method that can cope with a disturbance.

In the present embodiment, there has been explained the case where the instruction for obtaining the respective frequency responses of the yaw-angle signal Y and the yaw-angular-velocity signal YR to the steering-angle signal RUA for the vessel 1 is implemented by means of the operation information CI from the operational device 30. However, it may be allowed that when detecting that the vessel 1 continues its sailing to the same stable azimuth, the azimuth control unit 200 determines to obtain the frequency responses, as may be necessary, and then outputs the steering-angle command signal RUAC in the shape of a rectangular wave or a saw-tooth wave. For example, it may be allowed that every predetermined time or each time the azimuth control apparatus 10 is started, the azimuth control unit 200 performs frequency-response obtaining operation and the control gain adjustment unit 500 calculates the frequency responses so that the control gain of the azimuth control unit 200 is adjusted.

Hardware Configuration of Azimuth Control Apparatus

Figure 2:
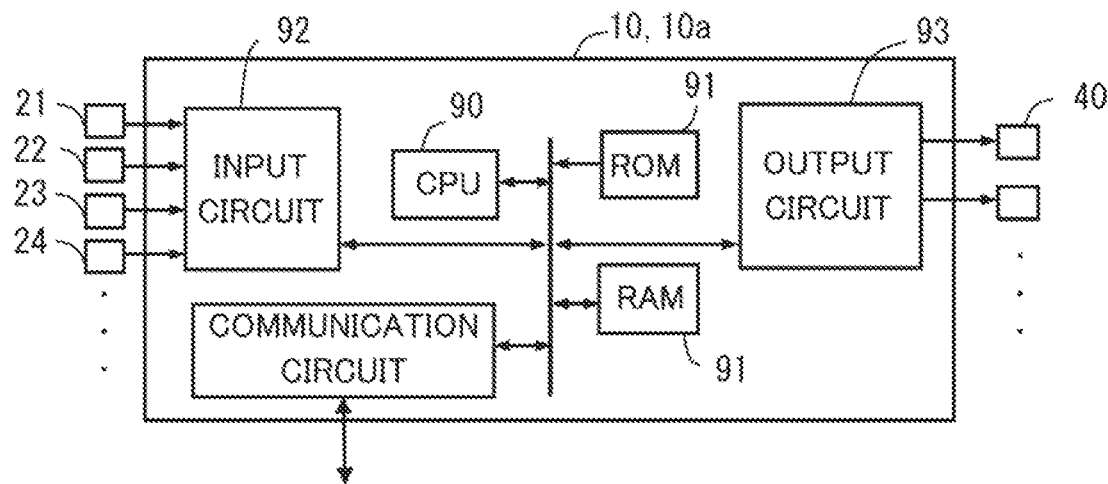
FIG. 2 is a hardware configuration diagram of the azimuth control apparatus according to Embodiment 1.

FIG. 2 is a hardware configuration diagram of the azimuth control apparatus 10. The hardware configuration in FIG. 2 can be applied also to an azimuth control apparatus 10a. Hereinafter, as the representative, the azimuth control apparatus 10 will be explained. In the present embodiment, the azimuth control apparatus 10 is an electronic control apparatus that controls the azimuth of a vessel. Respective functions of the azimuth control apparatus 10 are realized by processing circuits provided in the azimuth control apparatus 10. Specifically, the azimuth control apparatus 10 includes, as the processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

It may be allowed that as the computing processing unit 90, an ASIC (Application Specific Integrated Circuit), an IC (Integrated Circuit), a DSP (Digital Signal Processor), an FPGA (Field Progranable Gate Array), each of various kinds of logic circuits, each of various kinds of signal processing circuits, or the like is provided. In addition, it may be allowed that as the computing processing unit 90, two or more computing processing units of the same type or different types are provided and respective processing items are executed in a sharing manner. As the storage apparatuses 91, there are provided a RAM (Random Access Memory) that can read data from and write data in the computing processing unit 90, a ROM (Read Only Memory) that can read data from the computing processing unit 90, and the like. As the storage apparatus 91, a nonvolatile or volatile semiconductor memory such as a flash memory, an EPROM, or an EEPROM, a magnetic disk, a flexible disk, an optical disk, a compact disk, a minidisk, a DVD, or the like may be utilized. The input circuit 92 is connected with various kinds of sensors including the sensor group 20 and the output signal of the operational device 30, switches, and communication lines, and is provided with an A/D converter, a communication circuit, and the like for inputting output signals from these sensors and switches and communication information to the computing processing unit 90. The output circuit 93 is provided with a driving circuit and the like for outputting control signals from the computing processing unit 90 to driving apparatuses including the steering-angle driving unit 40.

The computing processing unit 90 executes software items (programs) stored in the storage apparatus 91 such as a ROM and collaborates with other hardware devices in the azimuth control apparatus 10, such as the storage apparatus 91, the input circuit 92, and the output circuit 93, so that the respective functions provided in the azimuth control apparatus 10 are realized. Setting data items such as a threshold value and a determination value to be utilized in the azimuth control apparatus 10 are stored, as part of software items (programs), in the storage apparatus 91 such as a ROM. It may be allowed that the respective functions included in the azimuth control apparatus 10 are configured with either software modules or combinations of software and hardware.

Coordinate System and Yaw Angle

Figure 3:
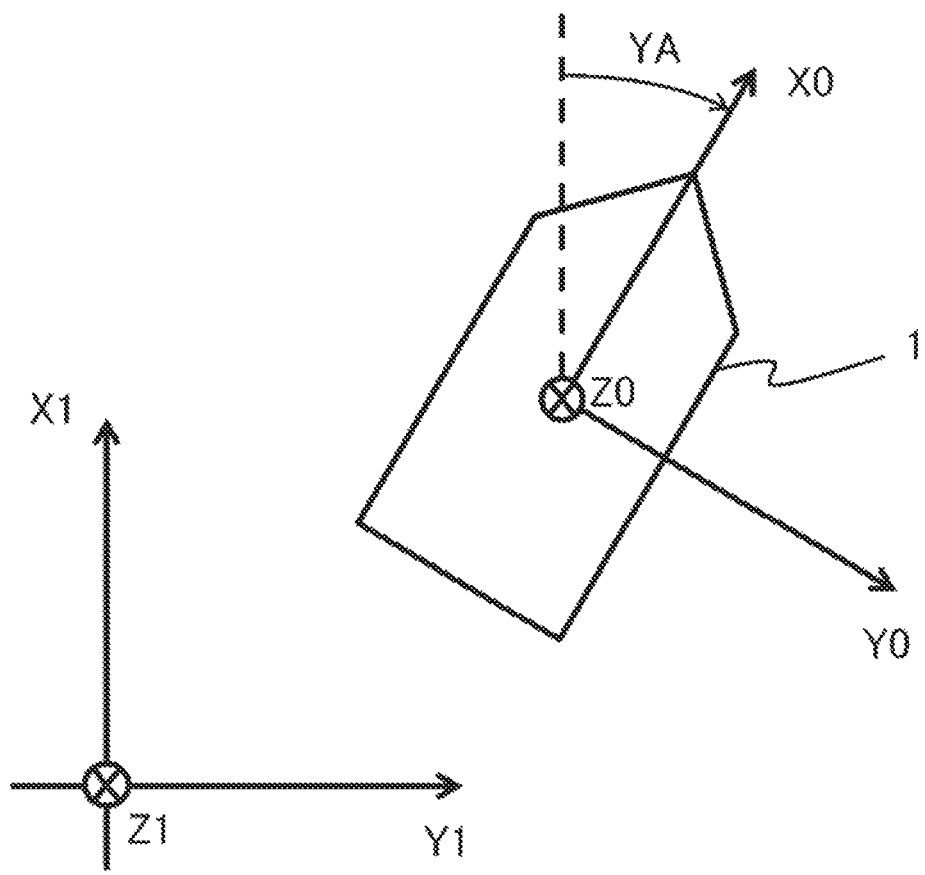
FIG. 3 is an explanatory chart of a coordinate system of a vessel in which the azimuth control apparatus according to Embodiment 1 is provided.

FIG. 3 is an explanatory chart of a coordinate system of the vessel 1 in which the azimuth control apparatus 10 according to Embodiment 1 is provided. A coordinate system X1-Y1-Z1 is the one whose reference is a fixed point on the ground that is 0 meters above sea level or on the water surface. A coordinate system X0-Y0-Z0 is the one whose reference is the hull of the vessel. Each of these coordinate systems is a right-handed system. Because located on the surface of the earth, the position of a vessel sailing on the sea of the earth or on the water surface of a river or a lake undergoes the effect of the spherical earth. However, when the distance between the vessel 1 and the fixed point on the ground that is 0 meters above sea level or on the water is small, the situation can be considered in a simplified manner by assuming that both the fixed point and the vessel 300 are on one and the same plane.

In the coordinate system X1-Y1-Z1 whose reference is a fixed point on the ground that is 0 meters above sea level or on the water, X1 denotes the north-south direction (the arrow indicates the north); Y1 denotes the east-west direction (the arrow indicates the east). Z1 denotes the vertical direction (the arrow indicates the bottom). The vessel 1 is located on the X1-Y1 plane; in the coordinate system X0-Y0-Z0 whose reference is the hull, X0 denotes the anteroposterior direction passing through the gravity center of the hull (the arrow indicates the front, i.e., the bow direction); Y0 denotes the left-and-right direction passing through the gravity center of the hull (the arrow indicates the right, i.e., the starboard direction); Z0 denotes the hull-structure vertical direction passing through the gravity center of the hull (the arrow indicates the bottom).

A yaw angle YA (referred to also as an azimuth angle) is a rotation angle around the Z0 axis; a yaw angular velocity (yaw rate) is a rotation angular velocity around the Z0 axis.

In the case where the azimuth to which the vessel should travel is instructed by the azimuth command generation unit 100, the azimuth command signal DRC is indicated with respect to the X1 direction (the north, in FIG. 2) in the coordinate system X1-Y1-Z1 whose reference is a fixed point on the ground that is 0 meters above sea level or on the water. The direction of the hull of the vessel 1 is indicated by a yaw angle with respect to the X1 direction. For example, in the case where it is instructed that the vessel should travel in the northeast, the vessel is operated in such a way as to maintain the yaw angle YA of 450 clockwise with respect to the north, which is the X1 direction.

In the case where the distance between the vessel 1 and the fixed point on the ground that is 0 meters above sea level or on the water is large, it cannot simply be considered that both the fixed point and the vessel 1 are on one and the same plane; thus, it is required to make calculation while taking it into consideration that the earth is a sphere. Also in this case, the vessel is operated in such a way as to maintain the yaw angle instructed with respect to the north on the water surface on which the vessel is located.

Flowchart Representing Basic Operation

Figure 4:
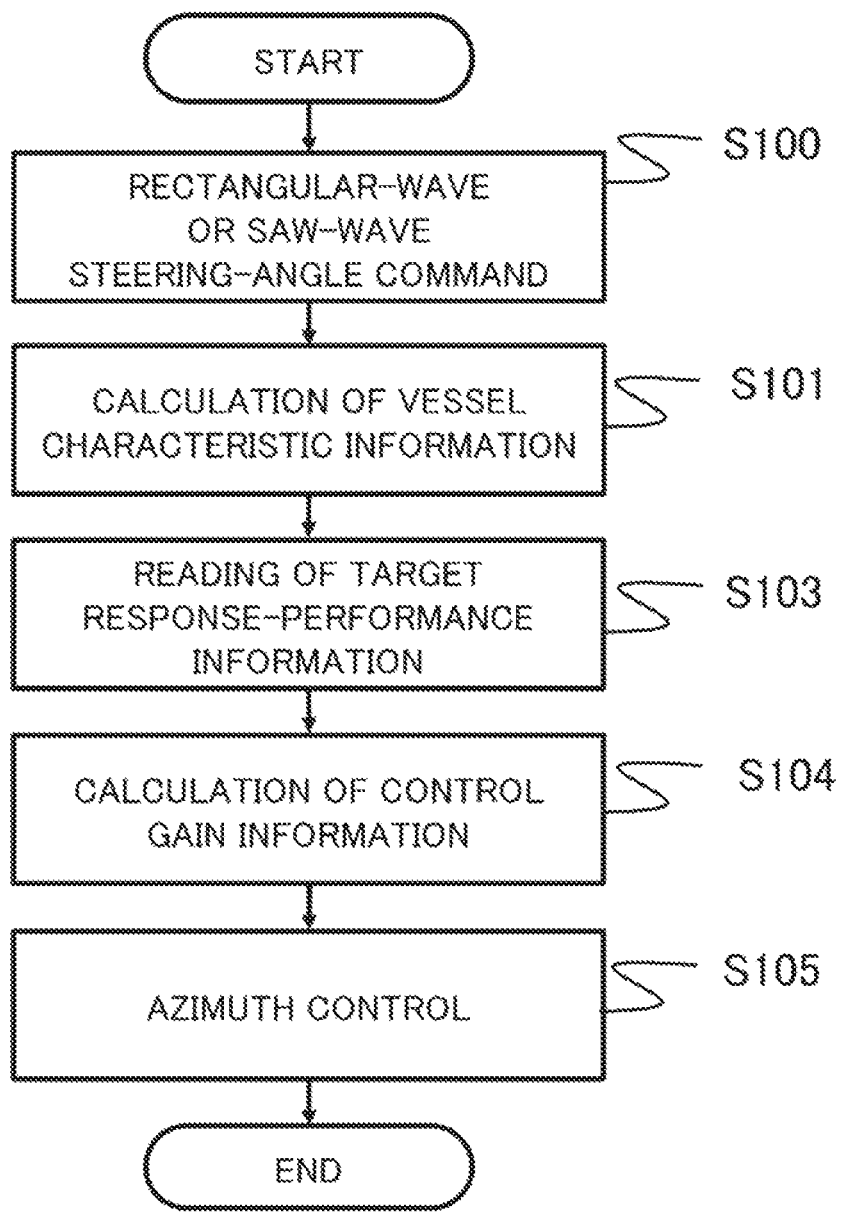
FIG. 4 is a flowchart representing basic operation of the azimuth control apparatus according to Embodiment 1.

FIG. 4 is a flowchart representing basic operation of the azimuth control apparatus 10 according to Embodiment 1. The azimuth control unit 200 obtains the vessel parameters, based on an instruction from the operational device 30 or a determination by the azimuth control unit 200, so as to adjust the control gain.

Because in the initial state, a reference transfer function has been set, the azimuth control unit 200 can calculate the steering-angle command signal RUAC, based on the instruction from the azimuth command generation unit 100, without performing adjustment. However, when the respective frequency responses of the yaw-angle signal Y and the yaw-angular-velocity signal YR to the steering-angle signal RUA for the vessel 1 are obtained, the control gain of the azimuth control unit 200 can be adjusted in accordance with the newest state of the vessel 1.

The flowchart in FIG. 4 is implemented each time the azimuth control apparatus 10 obtains the vessel parameters so as to adjust the control gain. In the step S100, while the vessel is sailing, the azimuth control unit 200 outputs the steering-angle command signal RUAC, as a rectangular-wave or saw-tooth-wave steering-angle command.

In the step S101, the frequency response calculation unit 400 obtains respective time-series data of the yaw-angle signal Y and the yaw-angular-velocity signal YR to the steering-angle signal RUA. The frequency response calculation unit 400 calculates the frequency response as vessel characteristic information FC. In this situation, it may be allowed that data of the vessel-speed signal V is concurrently obtained so that the frequency response corresponding to the vessel speed is calculated.

In the step S103, target response-performance information TC is read. The target response-performance information TC is preliminarily determined for the vessel 1; the basic reference transfer function is set from the target response-performance information TC.

In the step S104, by use of the frequency response (vessel characteristic information FC) calculated in the step S101, control gain information GI is calculated based on the reference transfer function set from the target response-performance information TC. In the step S105, by use of the control gain information GI, the azimuth control unit 200 performs an azimuth control calculation so as to output the steering-angle command signal RUA. In response to the steering-angle command signal RUAC, the steering-angle control unit 600 outputs the steering-angle driving command signal RUAD so as to control the steering-angle driving unit 40; as a result, the azimuth of the vessel 1 is controlled. In this situation, it may be allowed that in the steps S101 through S105, data of the vessel-speed signal V is concurrently obtained so that the control gain information GI corresponding to the vessel speed is calculated.

The respective functions of the azimuth command generation unit 100, the azimuth control unit 200, the gain adjusting unit 300, and the frequency response calculation unit 400 included in the vessel azimuth control apparatus 10 will be explained in detail.

Azimuth Command Generation Unit

Figure 5:
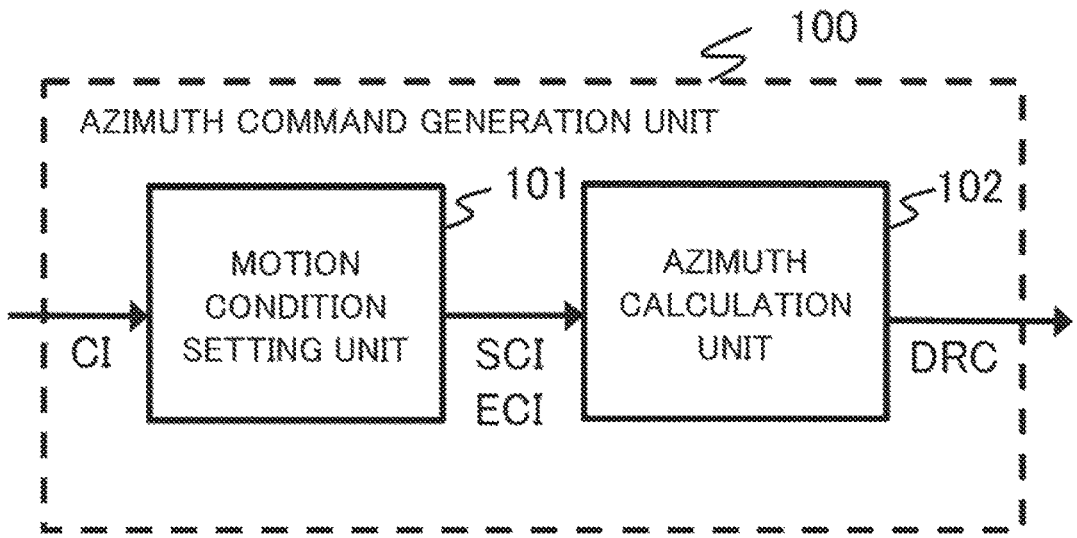
FIG. 5 is a block diagram representing a configuration of an azimuth command generation unit of the azimuth control apparatus according to Embodiment 1.

FIG. 5 is a block diagram representing the configuration of the azimuth command generation unit 100 of the azimuth control apparatus 10 according to Embodiment 1. The azimuth command generation unit 100 includes a motion condition setting unit 101 and an azimuth calculation unit 102. The motion condition setting unit 101 sets an initial condition and a terminal condition for sailing of a vessel 1; when a vessel operator performs inputting to the operational device 30 of the vessel 1, the initial condition and the terminal condition are set through the operation information CI.

By means of the operational device 30 of the vessel 1, the vessel operator sets information items on a posture angle (a synonym of an azimuth angle or a yaw angle), an angular velocity (a value obtained through one-time differentiation of the posture angle), and an angular acceleration (a value obtained through two-time differentiation of the posture angle) in each of an initial state before sailing starts and a terminal state when a desired sailing has been completed. It may be allowed that the condition setting is performed with values obtained by converting the posture angle, the angular velocity and the angular acceleration into numerals. The setting can be performed by use of a user interface in which a GNSS is provided as a touch panel. The setting may be performed in such a way that with regard to the initial state, a detection value of the sensor group 20 is automatically taken in, as sensor-group information, and only the terminal state is touch-inputted by use of a user-interface screen.

The azimuth calculation unit 102 receives initial-state information SCI and terminal-state information ECI outputted by the motion condition setting unit 101 and then calculates the azimuth command signal DRC. In this situation, two or more calculation methods for the azimuth command signal DRC are conceivable. For example, a provided orbit can be calculated as a time polynomial, based on the posture angle, the angular velocity, and the angular acceleration in each of the initial-state information SCI and the terminal-state information ECI of the vessel 1, obtained by the motion condition setting unit 101.

In addition, it is also made possible to calculate a linear orbit that connects the initial-state information SCI with the terminal-state information ECI in the shortest time. It is also made possible to calculate an orbit through which the vessel can travel from the initial state to the terminal state with a minimum quantity of fuel. That is to say, it may be allowed that when the initial state transits to the terminal state, the orbit is calculated as an optimum orbit that minimizes a preliminarily set evaluation function, for example, as an optimum orbit in terms of a shortest time or in terms or a minimum quantity of fuel.

Azimuth Control Unit

Figure 6:
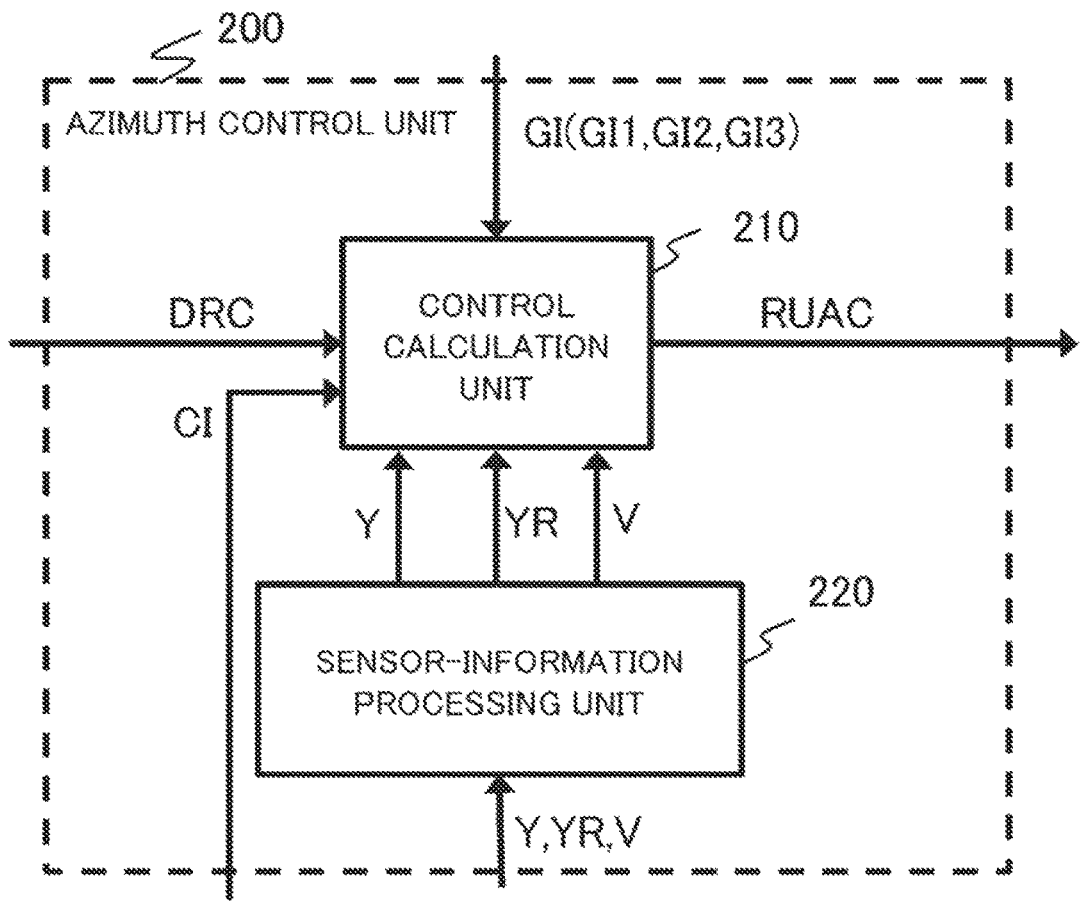
FIG. 6 is a block diagram representing the configuration of an azimuth control unit of the azimuth control apparatus according to Embodiment 1.

FIG. 6 is a block diagram representing the configuration of the azimuth control unit 200 of the azimuth control apparatus 10 according to Embodiment 1. The azimuth control unit 200 includes a control calculation unit 210 and a sensor-information processing unit 220. The sensor-information processing unit 220 outputs the yaw-angle signal Y and the yaw-angular-velocity signal YR, which are the outputs of the sensor group 20, to the control calculation unit 210. In this situation, it may be allowed that data of the vessel-speed signal V is concurrently obtained and then is outputted to the control calculation unit 210.

The sensor-information processing unit 220 may have a function of converting information pieces of the various kinds of sensors, which are serial signals transmitted from the sensor group 20, into parallel signals. In addition, the sensor-information processing unit 220 may have a function of generating the yaw-angular-velocity signal YR by applying a time differentiation to the yaw-angle signal Y.

The control calculation unit 210 outputs the steering-angle command signal RUAC to the steering-angle control unit 600, based on the azimuth command signal DRC, which is the output of the azimuth command generation unit 100, the control gain information GI (GI1, GI2, GI3), which is the output of the gain adjusting unit 300, and the yaw-angle signal Y and the yaw-angular-velocity signal YR, which are the outputs of the sensor-information processing unit 220. In this situation, it may be allowed that the control gain is concurrently switched in accordance with the data of the vessel-speed signal V and the steering-angle command signal RUAC is calculated and outputted.

Control Calculation Unit

Figure 7:
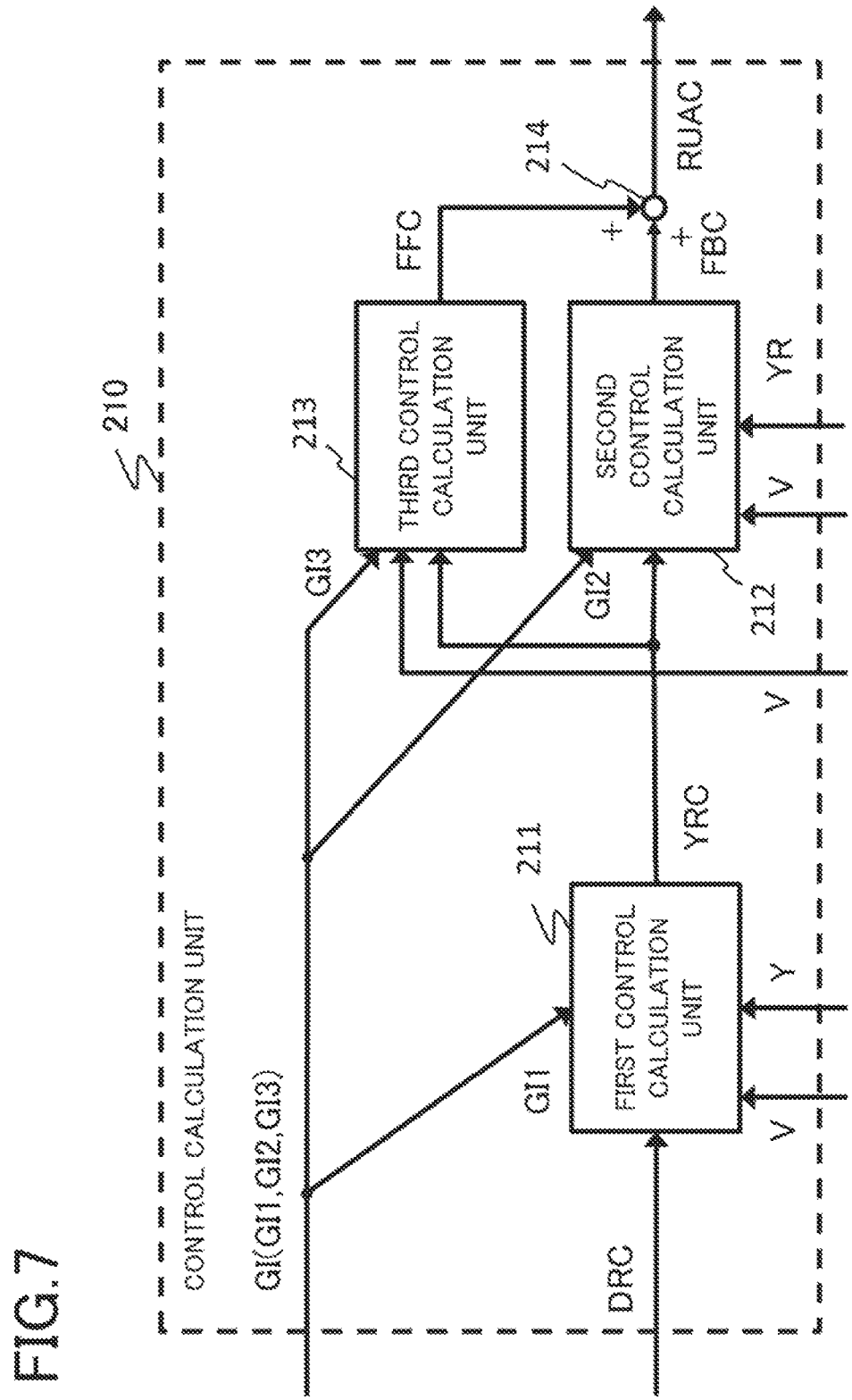
FIG. 7 is a block diagram representing a configuration of a control calculation unit of the azimuth control apparatus according to Embodiment 1.

FIG. 7 is a block diagram representing the configuration of the control calculation unit 210 of the azimuth control apparatus 10 according to Embodiment 1. The control calculation unit 210 includes a first control calculation unit 211, a second control calculation unit 212, a third control calculation unit 213, and an adder 214.

By means of a publicly known P (Proportional)-control utilizing the first control gain information GI1, the first control calculation unit 211 calculates the yaw-angular-velocity command signal YRC in such a way that the error between the azimuth command signal DRC and the yaw-angle signal Y becomes zero, and then outputs the yaw-angular-velocity command signal YRC. By means of a publicly known PI (Proportional Integral)—control utilizing the second control gain information GI2, the second control calculation unit 212 calculates an FB (Feedback) steering-angle command FBC in such a way that a yaw-angular velocity error between the yaw-angular-velocity command signal YRC, which is the output of the first control calculation unit 211, and the yaw-angular-velocity signal YR becomes zero, and then outputs the FB steering-angle command FBC.

Based on the yaw-angular-velocity command signal YRC, which is the output of the first control calculation unit 211, and the third control gain information GI3, the third control calculation unit 213 calculates an FF (Feedforward) steering-angle command FFC, and then outputs the FF steering-angle command FFC. The adder 214 adds the FF steering-angle command FFC, which is the output of the third control calculation unit 213, to the FB steering-angle command FBC, which is the output of the second control calculation unit 212.

The adder 214 outputs the steering-angle command signal RUAC, as the result of the addition. Such a configuration of the control calculation unit 210 makes it possible that the first control calculation unit 211 and the second control calculation unit 212 raise the azimuth stability and that the third control calculation unit 213 raises the azimuth responsiveness. It may be allowed that the first control calculation unit 211, the second control calculation unit 212, and the third control calculation unit 213 concurrently switch the respective control gains in accordance with the data of the vessel-speed signal V and then output the corresponding signal and commands.

Control Gain Adjustment Unit

Figure 8:
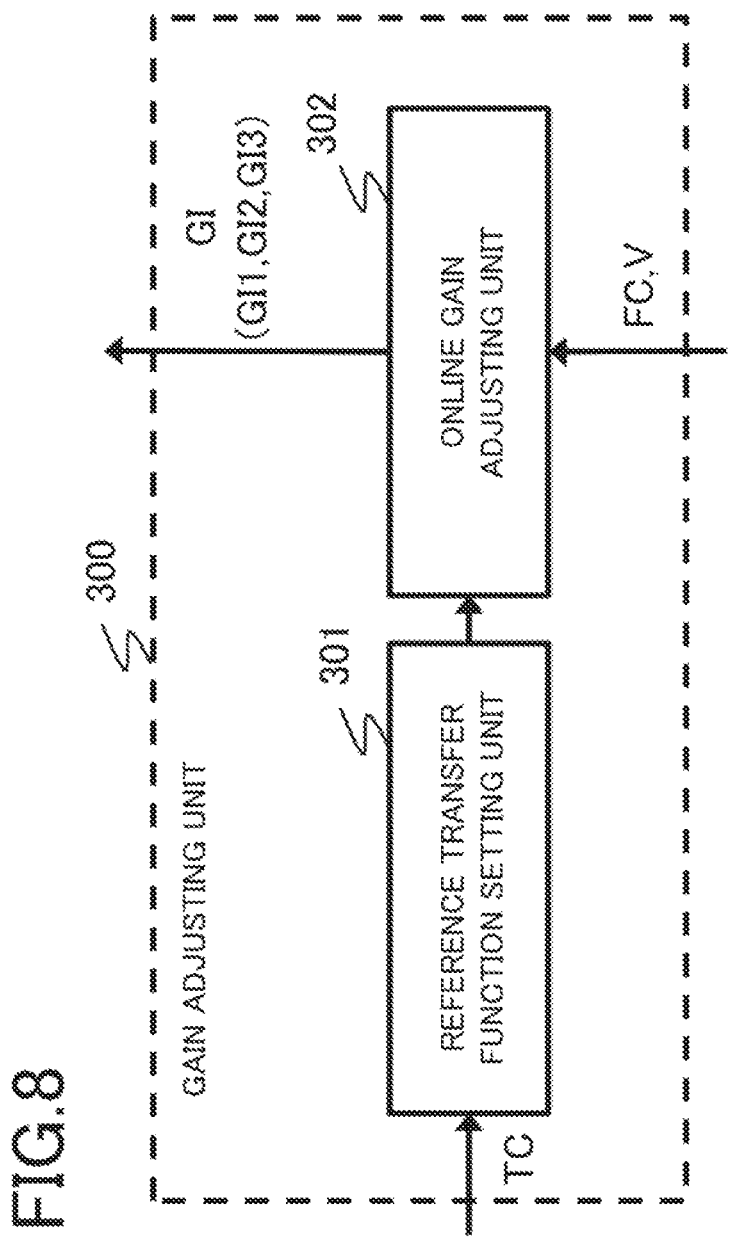
FIG. 8 is a block diagram representing a configuration of a control gain adjustment unit of the azimuth control apparatus according to Embodiment 1.

FIG. 8 is a block diagram representing the configuration of the gain adjusting unit 300 of the azimuth control apparatus 10 according to Embodiment 1. In general, azimuth motion of the vessel 1 can be characterized as the frequency response of the yaw-angular-velocity signal YR to the steering-angle signal RUA. For example, in Patent Document 1, as the frequency response of the yaw-angular-velocity signal YR to the steering-angle signal RUA, a first-order model is dealt with.

However, the frequency response of the vessel 1 largely changes depending on a motion state of the vessel 1, for example, the speed of the vessel (vessel speed, hereinafter); for example, in the case where the steering angle is turned by a predetermined amount at predetermined speed, the yaw-angular-velocity signal YR is small in a low-vessel-speed region and large in a high-vessel-speed region. Accordingly, in order to diminish unevenness in the control response, depending on the vessel speed, and to make the crossover frequency determining the response of a control system stay constant regardless of the vessel speed, it is required that the control gain information to be inputted to the control calculation unit 210 can be changed in accordance with the vessel speed.

Figure 9:
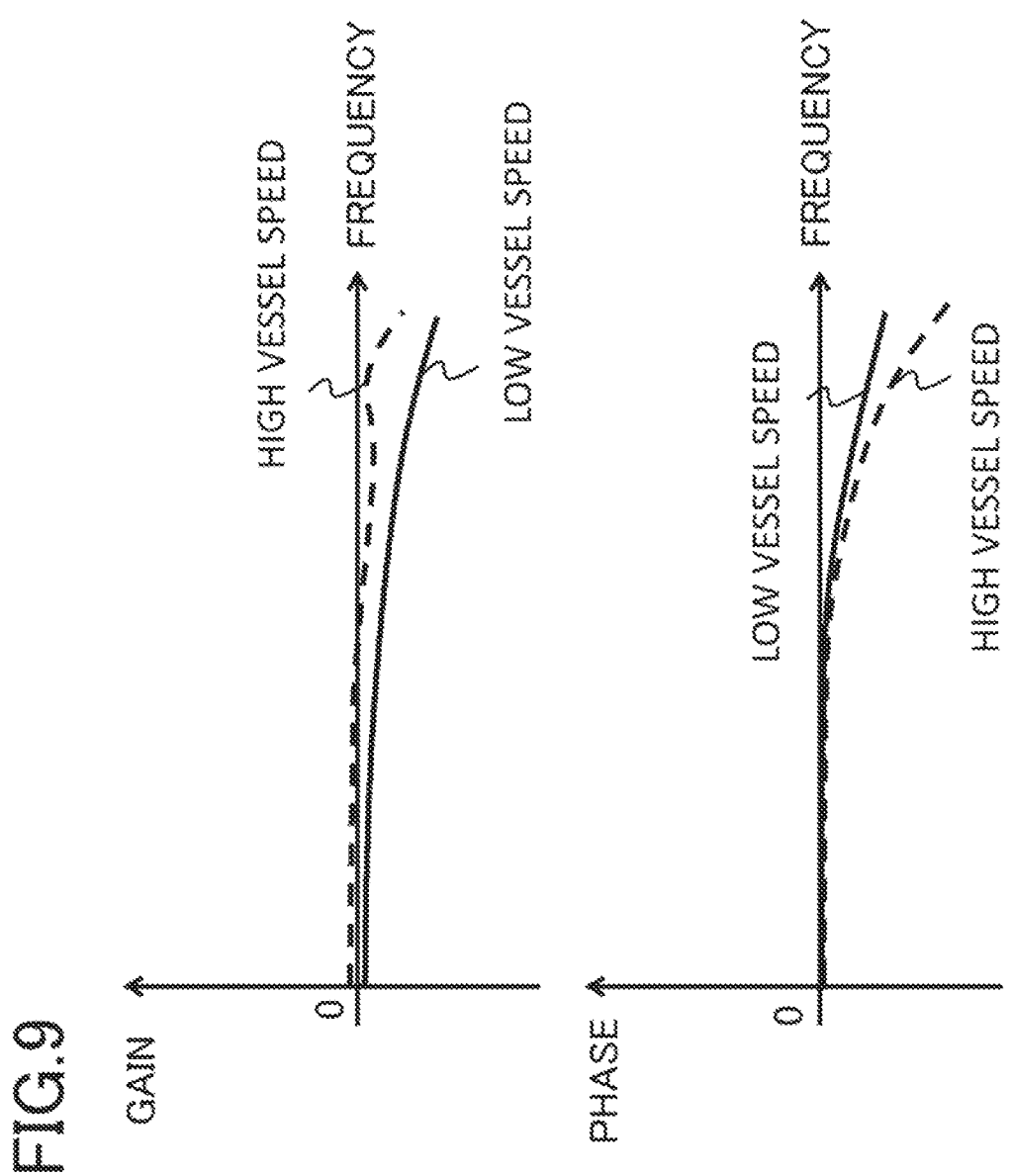
FIG. 9 is a chart representing vessel characteristic information of the azimuth control apparatus according to Embodiment 1.

FIG. 9 is a chart representing vessel characteristic information of the azimuth control apparatus 10 according to Embodiment 1. FIG. 9 represents the frequency response of the yaw-angular-velocity signal YR to the steering-angle signal RUA, with regard to the gain and the phase thereof. In the low-speed region (represented by a solid line) where the vessel speed is low, the frequency response has a characteristic that can readily be approximated with a first-order model. However, in the high-speed region (represented by a broken line) where the vessel speed is high, the gain increases; concurrently, the frequency response has a gentle peak gain at the high-frequency side, depending on conditions, and hence cannot be approximated with a first-order model. FIG. 9 represents the frequency response of the yaw-angular-velocity signal YR; however, the above description can be applied to the yaw-angle signal Y.

In order to appropriately design or set the control gain information GI in the control calculation unit 210 in accordance with the vessel speed, the gain adjusting unit 300 calculates the control gain information GI, based on the vessel characteristic information and the target response-performance information TC, which are the outputs of the after-mentioned frequency response calculation unit 400, and then outputs the control gain information GI. The gain adjusting unit 300 represented in FIG. 8 includes a reference transfer function setting unit 301 and an online gain adjusting unit 302.

Based on the arbitrarily selected target response-performance information TC, for example, the gain crossover frequency, the reference transfer function setting unit 301 outputs a reference transfer function representing the frequency response of the yaw-angle signal Y to the steering-angle signal RUA and a reference transfer function representing the frequency response of the yaw-angular-velocity signal YR to the steering-angle signal RUA for achieving a target response performance. Then, the online gain adjusting unit 302 calculates and outputs the control gain information pieces GI (GI1, GI2, GI3) related to the first through the third control calculation units (211 through 213) in the foregoing control calculation unit 210.

Based on the vessel characteristic information FC, which is the output of the after-mentioned frequency response calculation unit 400, and the reference transfer function, which is the output of the reference transfer function setting unit 301, the online gain adjusting unit 302 calculates the control gain information pieces GI1 and GI2 related to the first and second control calculation units 211 and 212, respectively, through a publicly known partial model matching method, for example.

In contrast, based on the vessel characteristic information, the online gain adjusting unit 302 calculates the control gain information GI3 related to the third control calculation unit 213, by use of, for example, the frequency response of the steering-angle signal RUA to the yaw-angular-velocity signal YR, which is an inverse model of the frequency response of the yaw-angular-velocity signal YR to the steering-angle signal RUA. In this situation, in the case where the foregoing inverse model includes a high-order time differentiation, for example, a two-time time differentiation, it may be allowed that in order to suppress the FF steering-angle command FFC, which is the output of the third control calculation unit 213, from steeply changing, a low-pass filter or moving-average processing is provided after the inverse model. In addition, it may be allowed that approximation processing for reducing the order of the inverse model itself is adopted.

It may also be allowed that as an input of the gain adjusting unit 300 in FIG. 8, data of the vessel-speed signal V is concurrently added and the control gain corresponding to the vessel speed is obtained.

Frequency Response Calculation Unit

Figure 10:
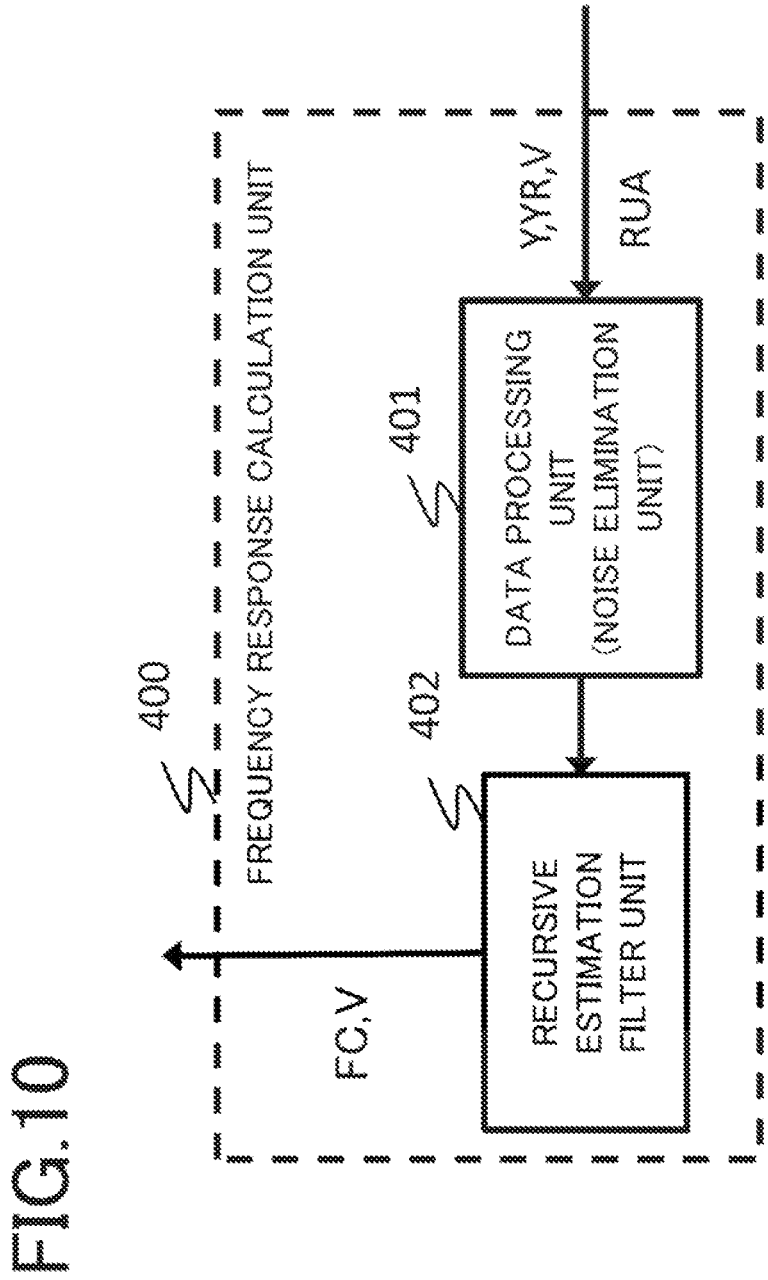
FIG. 10 is a block diagram representing a configuration of a frequency response calculation unit of the azimuth control apparatus according to Embodiment 1.

FIG. 10 is a block diagram representing the configuration of the frequency response calculation unit 400 of the azimuth control apparatus 10 according to Embodiment 1. The frequency response calculation unit 400 inputs the vessel characteristic information FC to the gain adjusting unit 300. In general, the frequency response of the azimuth motion of the vessel 1 changes in accordance with the vessel speed.

It is conceivable that this frequency response is obtained, for example, from the amplification factor of the response of the yaw-angular-velocity signal YR to the steering-angle signal RUA and the phase difference therebetween at a time when the sine-wave steering-angle command signal RUAC is applied in such a way as to be frequency-swept while the vessel 1 is sailing at constant speed. However, because it requires massive measurement time and memory capacity for obtaining low-frequency characteristics, this method is not suitable to estimate online the vessel characteristic information FC that characterizes the foregoing frequency response.

In contrast, the frequency response calculation unit 400 receives sensor-group information, which is the output of the sensor group 20 at a time when as the steering-angle command signal RUAC, a rectangular wave signal or a saw-tooth wave signal having sufficient power within a noteworthy band width in the frequency response is applied for a predetermined time, and then estimates online and outputs the vessel characteristic information. The frequency response calculation unit 400 includes a data processing unit 401 and a recursive estimation filter unit 402.

The data processing unit 401 is a filter for eliminating observation noise superimposed on the steering-angle signal RUA, the yaw-angular-velocity signal YR, and the vessel-speed signal V, based on the sensor-group information, which is the output of the sensor group 20. The data processing unit 401 may be called as a noise elimination unit. The outputs of the data processing unit 401 are respective processed data pieces of the steering-angle signal RUA, the yaw-angular-velocity signal YR, and the vessel-speed signal V.

The recursive estimation filter unit 402 outputs the vessel characteristic information FC, based on the processed data pieces, which are the outputs of the data processing unit 401. For example, by use of a publicly known recursive least squares method, the recursive estimation filter unit 402 recursively estimates a model for the frequency response of the yaw-angular-velocity signal YR to the steering-angle signal RUA, and then outputs the model as the vessel characteristic information FC. As described above, in the high-speed region where the vessel speed is high, a peak gain may occur at the high-frequency side. Accordingly, in order to deal with such a high-speed region where a peak gain occurs, the order of the frequency-response model is raised up to the second or higher and then the model for the frequency response of the yaw-angular-velocity signal YR to the steering-angle signal RUA is recursively estimated. The frequency-response model for the frequency response of the yaw-angle signal Y to the steering-angle signal RUA may be estimated in the same manner.

The method to be utilized in the recursive estimation filter unit 402 is not limited to the foregoing recursive least squares method. The vessel characteristic information FC can be obtained by use of any one of various publicly known recursive estimation methods such as a Kalman filter, a Kalman smoother, and a recursive subspace identification method.

A conventional offline estimation method such as algorithm of an SQP (Sequential Quadratic Programming) takes in and accumulates a great amount of data so as to estimate parameters offline; thus, much memory capacity and calculation time are required. In comparison with such an offline estimation method, use of a recursive estimation method makes it possible to recursively delete unnecessary past data each time new measurement data can be obtained. As a result, it is made possible to reduce the memory capacity. Moreover, because data is processed recursively, the amount of date to be dealt with decreases and hence the calculation time is shortened.

In this situation, when the estimated frequency-response model is associated with the vessel speed, which is the output of the data processing unit 401, the vessel characteristic information FC can be accumulated as a function of the vessel speed or a map. Accumulation of the vessel characteristic information FC makes it possible to immediately cope with a case where the vessel speed changes or a case where the target response-performance information TC is changed. It is made possible that based on the accumulated vessel characteristic information FC, the control gain information GI is appropriately designed or set, without re-estimating the frequency response.

As described above, there has been explained the vessel azimuth control apparatus 10, according to Embodiment 1, that makes the vessel 1 sail to a desired azimuth. The azimuth control apparatus 10 has the azimuth command generation unit 100 that outputs the azimuth command signal DRC, the frequency response calculation unit 400 that receives sensor-group information from the sensor group 20 mounted in a vessel and outputs the vessel characteristic information FC, and the gain adjusting unit 300 that outputs the control gain information GI, based on the vessel characteristic information FC, which is the output of the frequency response calculation unit 400. The azimuth control unit 200 outputs the steering-angle command signal RUAC, based on the azimuth command signal DRC, which is the output of the azimuth command generation unit 100, the control gain information GI from the gain adjusting unit 300, and sensor-group information from the sensor group 20.

Accordingly, it is made possible to instantaneously calculate an appropriate control gain for an error in modeling the control subject that can change depending on the vessel speed and the like. As a result, it is made possible to perform robust designing for a change in the characteristics of the control subject and to appropriately adjust the disturbance suppression performance and the target value response performance related to the azimuth control. Moreover, it is made possible to realize stable azimuth control, without promoting a vibration excited by a disturbance factor, such as a tidal current, an ocean wave, or a storm, applied to the vessel. Furthermore, because it is not required to identify the vessel parameters by use of algorithm such as an SQP, information processing in the vessel azimuth control apparatus requires no excessive memory capacity and calculation time.

2. Embodiment 2

Figure 11:
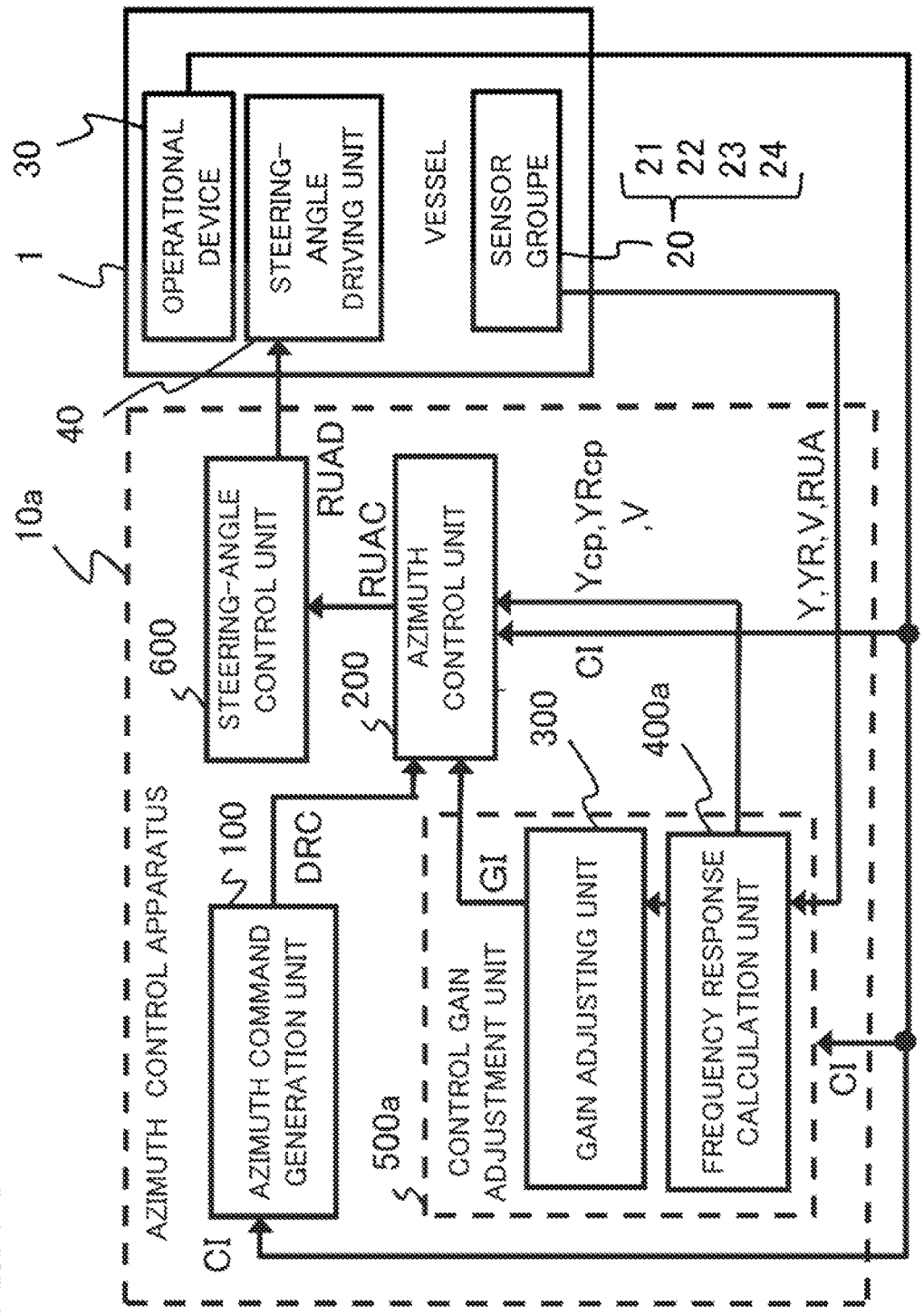
FIG. 11 is a configuration diagram of an azimuth control apparatus according to Embodiment 2.

FIG. 11 is a configuration diagram of an azimuth control apparatus 10a according to Embodiment 2. FIG. 12 is a block diagram representing the configuration of a frequency response calculation unit 400a of the azimuth control apparatus 10a according to Embodiment 2.

The azimuth control apparatus 10a according to Embodiment 2 represented in FIG. 11 differs from the azimuth control apparatus 10 according to Embodiment 1 in that sensor-group information to be inputted to the azimuth control unit 200 are corrected sensor-group information that are calculated by the frequency response calculation unit 400a of a control gain adjustment unit 500a. Other configurations are the same as those in FIG. 1; therefore, explanations therefore will be omitted.

The frequency response calculation unit 400a includes the data processing unit 401 and a recursive estimation filter unit 402a. In Embodiment 1, the output of the recursive estimation filter unit 402 is only the vessel characteristic information FC. However, in Embodiment 2, while estimating and outputting the vessel characteristic information FC by use of a publicly known recursive estimation method such as a recursive least squares method, a Kalman filter, a Kalman smoother, or a recursive subspace identification method, the recursive estimation filter unit 402a outputs a corrected yaw-angular-velocity signal YRcp and a corrected yaw-angle signal Ycp obtained by eliminating the effects of observation noise and system noise superimposed on the sensor-group information, as corrected sensor-group information (i.e., a new control amount), to the azimuth control unit 200 so as to perform azimuth control.

Such a configuration makes it possible that even when a sensor group on which observation noise is liable to be superimposed is utilized, the disturbance suppression performance and the target value response performance are appropriately adjusted; thus, stable azimuth control can be realized.

In foregoing Embodiments 1 and 2, it may be allowed that the azimuth command generation unit 100 of the azimuth control apparatus 10, the azimuth control unit 200, the gain adjusting unit 300, the frequency response calculation units 400 and 400a, and the steering-angle control unit 600, represented in FIGS. 1 and 11, and the control blocks that are included in the respective foregoing units and have the respective functions represented in FIGS. 4 through 8 and FIGS. 10 through 12 are configured with separate control circuits. Alternatively, it may be allowed that all of these units are collectively configured with a single control circuit. Moreover, it may be allowed that the foregoing control blocks are integrated while including the steering-angle driving mechanism that controls the steering angle of an outboard engine or an inboard engine. The processing circuit for realizing these functions may be dedicated hardware. Each of these functions can also be configured with a CPU (referred to also as a central processing unit, a processing device, a calculation apparatus, a microprocessor, a microcomputer, a processor, a DSP, or the like).

In the case where the control portion in each of the vessel azimuth control apparatuses 10 and 10a in Embodiment 1 and Embodiment 2, respectively, is configured with software, the function of each of the control portions in the respective embodiments is realized by software of the type where each time software is executed, it is downloaded on a memory before being executed, by firmware fixed in a nonvolatile storage of a computer, or by a combination of the software and the firmware of the foregoing types. The software and the firmware of the foregoing types are each described as programs and are stored in memories. The processor, which is a processing circuit, reads and executes the program stored in the memory so as to realize the function of each of the respective units. These programs make the computer execute the respective procedures and methods of the foregoing units. In this situation, a nonvolatile or volatile semiconductor memory such as a PAM, a ROM, a flash memory, an EPROM, or an EEPROM, a magnetic disk, a flexible disk, an optical disk, a compact disk, a minidisk, a DVD, or the like is suitable for the foregoing memory.

In addition, it may be allowed that the function of each of the foregoing respective control blocks is realized partially by dedicated hardware and partially by the software or firmware of the foregoing type. As described above, the function of the processing circuit in each of the embodiments can be realized by hardware, the software or the firmware of the foregoing type, or a combination of these constituent elements. In the case of a hardware configuration, various kinds of information items required for the processing are preliminarily set in the circuit; in the case of a software configuration, the various kinds of information items are preliminarily stored in the memory.

As a matter of course, it is made possible that in each of the foregoing embodiments, the control calculation unit is configured only with an angular major loop, with a double loop including an angular major loop and an angular-velocity minor loop, or with a triple loop including an angular major loop, an angular-velocity minor loop, and an angular-acceleration minor loop. In this situation, the angular acceleration may be obtained either by applying two-time differentiation to the yaw-angle signal Y, which is one of the sensor-group information items, or by applying one-time differentiation to the yaw-angular-velocity signal YR.

Furthermore, in each of the embodiments, as the configuration of the controller, not only a classic control system but also a modern control system for state-feedback control can be utilized.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

What is claimed is:

1. A vessel azimuth control apparatus comprising:
an azimuth command generator that generates an azimuth command signal indicating an azimuth to which a vessel should travel;
a yaw-angle detector that outputs a yaw-angle signal indicating a rotation angle around a vertical axis passing through a gravity center of the vessel;
a yaw-angular-velocity detector that outputs a yaw-angular-velocity signal indicating a rotation angular velocity around the vertical axis passing through the gravity center of the vessel;
a steering-angle detector that outputs a steering-angle signal indicating an angle of a rudder of the vessel;
an azimuth controller that outputs a steering-angle command signal for making the vessel turn to the azimuth to which the vessel should travel, based on the azimuth command signal generated by the azimuth command generator, the yaw-angle signal outputted by the yaw-angle detector, and the yaw-angular-velocity signal outputted by the yaw-angular-velocity detector;
a steering-angle controller that control a rudder, based on the steering-angle command signal outputted by the azimuth controller; and
a control gain adjuster that calculates respective frequency responses of the yaw-angle signal and the yaw-angular-velocity signal to the steering-angle signal outputted by the steering-angle detector and then adjusts a control gain of the azimuth controller,
wherein the azimuth controller includes
a first control calculator that calculates a yaw-angular-velocity command signal for making an error between the azimuth command signal and the yaw-angle signal become zero,
a second control calculator that calculates a feedback steering-angle command signal for making an error between the yaw-angular-velocity command signal calculated by the first control calculator and the yaw-angular-velocity signal become zero,
a third control calculator that calculates a feed-forward steering-angle command signal, based on the yaw-angular-velocity command signal, and an adder that adds the feedback steering-angle command signal calculated by the second control calculator with the feed-forward steering-angle command signal calculated by the third control calculator and then outputs a steering-angle command signal.

2. The vessel azimuth control apparatus according to claim 1, further comprising a vessel-speed detector that outputs a vessel-speed signal indicating a speed of the vessel, wherein the control gain adjuster calculates the respective frequency responses in accordance with the vessel-speed signal outputted by the vessel-speed detector and then adjusts a control gain of the azimuth controller in accordance with the vessel-speed signal.

3. The vessel azimuth control apparatus according to claim 1, further comprising a noise eliminator for eliminating noise superimposed on the yaw-angle signal and the yaw-angular-velocity signal, wherein the azimuth controller outputs the steering-angle command signal, based on the yaw-angle signal and the yaw-angular-velocity signal from which the noise eliminator has eliminated noise.

4. The vessel azimuth control apparatus according to claim 1, wherein the control gain adjuster adjusts a control gain by use of a second-or higher-order frequency-response model.

5. The vessel azimuth control apparatus according to claim 1, wherein the azimuth controller outputs the steering-angle command signal for making an error between the azimuth command signal and the yaw-angle signal become zero.

6. The vessel azimuth control apparatus according to claim 1, wherein the control gain adjuster includes
a reference transfer function setter that sets a yaw-angle-signal reference transfer function having a target frequency response for the yaw-angle signal and a yaw-angular-velocity-signal reference transfer function having a target frequency response for the yaw-angular-velocity signal and
an online gain adjuster that adjusts a control gain of the azimuth controller, based on the yaw-angle-signal reference transfer function and the yaw-angular-velocity-signal reference transfer function set by the reference transfer function setter.

7. A vessel azimuth control method comprising:
generating an azimuth command signal indicating an azimuth to which a vessel should travel;
outputting a yaw-angle signal indicating a rotation angle around a vertical axis passing through a gravity center of the vessel;
outputting a yaw-angular-velocity signal indicating a rotation angular velocity around the vertical axis passing through the gravity center of the vessel;
outputting a steering-angle signal indicating an angle of a rudder of the vessel;
outputting a steering-angle command signal for making the vessel turn to the azimuth to which the vessel should travel, based on the azimuth command signal generated by the azimuth command generator, the yaw-angle signal outputted by the yaw-angle detector, and the yaw-angular-velocity signal outputted by the yaw-angular-velocity detector;
controlling a rudder, based on the steering-angle command signal;
calculating respective frequency responses of the yaw-angle signal and the yaw-angular-velocity signal to the steering-angle signal outputted by the steering-angle detector; and
adjusting a control gain of the azimuth controller,
wherein outputting the steering-angle command signal includes
calculating a yaw-angular-velocity command signal for making an error between the azimuth command signal and the yaw-angle signal become zero,
calculating a feedback steering-angle command signal for making an error between the yaw-angular-velocity command signal calculated by the first control calculator and the yaw-angular-velocity signal become zero,
calculating a feed-forward steering-angle command signal, based on the yaw-angular-velocity command signal,
adding the feedback steering-angle command signal calculated by the second control calculator with the feed-forward steering-angle command signal calculated by the third control calculator, and
outputting a steering-angle command signal.

8. The vessel azimuth control method according to claim 7, further comprising:
outputting a vessel-speed signal indicating a vessel speed of the vessel,
wherein adjusting a control gain of the azimuth controller includes
calculating the respective frequency responses in accordance with the vessel-speed signal outputted by the vessel-speed detector and adjusting the control gain of the azimuth controller in accordance with the vessel-speed signal.

9. The vessel azimuth control method according to claim 7, further comprising
eliminating noise superimposed on the yaw-angle signal and the yaw-angular-velocity signal, wherein outputting the steering-angle command signal, the steering-angle command signal is outputted, based on the yaw-angle signal and the yaw-angular-velocity signal from which the noise eliminator has eliminated noise.

10. The vessel azimuth control method according to claim 7, wherein adjusting a control gain includes
generating a rectangular-wave or saw-tooth-wave signal, as the steering-angle command signal, for a predetermined period,
controlling a rudder,
calculating respective frequency responses of the yaw-angle signal and the yaw-angular-velocity signal to the steering-angle signal outputted by the steering-angle detector, and
adjusting a control gain of the azimuth controller.

* * * * *